Figure 1:
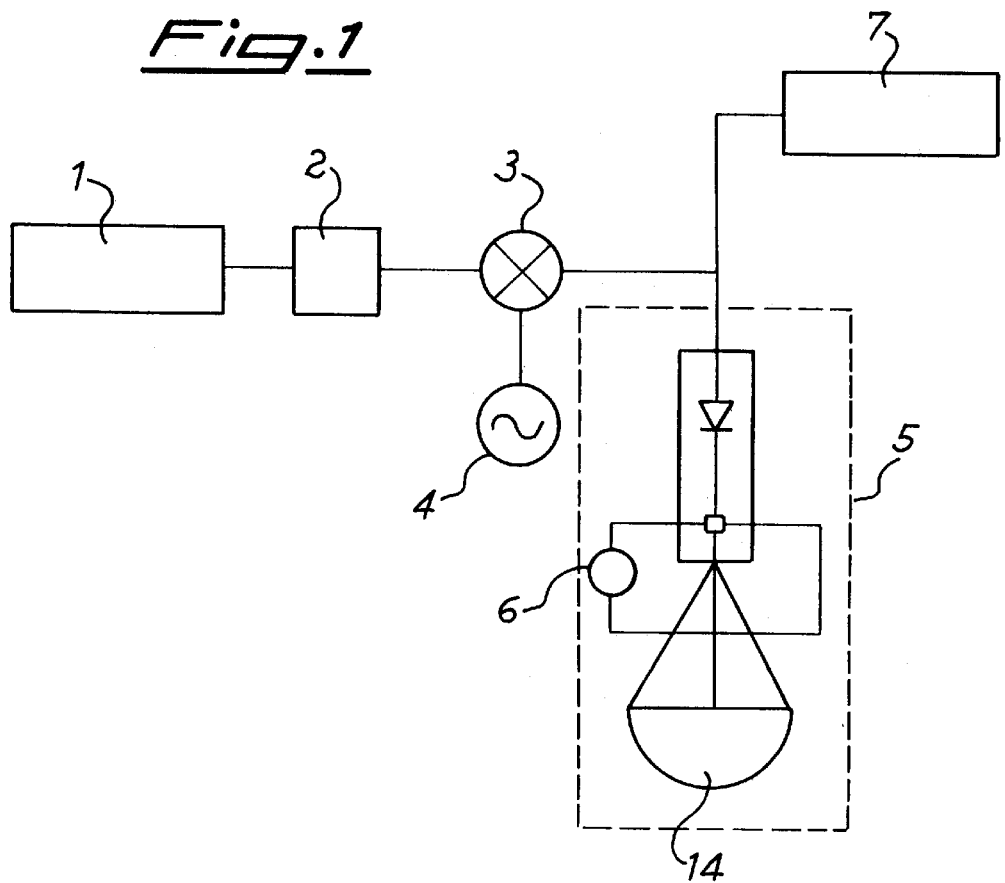

United States Patent
Baldi

[19]

[11] Patent Number: 5,991,474
[45] Date of Patent: Nov. 23, 1999

[54] OBSTACLE SENSOR OPERATING BY COLLIMATION AND FOCUSING OF THE EMITTED WAVE

[76] Inventor: Franco Baldi, via Preneste, 8, Milan, Italy

[21] Appl. No.: 08/970,074

[22] Filed: Nov. 13, 1997

[30] Foreign Application Priority Data

Nov. 18, 1996 [IT] Italy .................................. RE96A0089
Oct. 28, 1997 [IT] Italy .................................. RE97A0080

[51] Int. Cl.$^6$ .................................................. H01Q 19/06
[52] U.S. Cl. .............................. 385/15; 342/52; 342/153; 342/361; 343/721; 343/753; 385/147
[58] Field of Search .................................. 385/12, 13, 15, 385/147; 342/52, 68, 104, 105, 118, 128, 133, 146, 147, 153, 157, 200, 361; 343/721, 753–756, 700 MS

[56] References Cited

U.S. PATENT DOCUMENTS

| | | | |
|---|---|---|---|
| 4,517,566 | 5/1985 | Bryant et al. | 342/117 |
| 4,845,422 | 7/1989 | Damon | 333/159 X |
| 5,202,692 | 4/1993 | Huguenin et al. | 342/179 |
| 5,227,800 | 7/1993 | Huguenin et al. | 342/179 |
| 5,247,306 | 9/1993 | Hardange et al. | 342/70 |

*Primary Examiner*—John D. Lee
*Attorney, Agent, or Firm*—Bucknam and Archer

[57] ABSTRACT

Millimetric wave device, capable of operating as a signal transceiving antenna, with an optimum image definition even at extremely short distances (about 1 mm). Depending on the more or less concentration of the waves, the so realised radar antenna adopts, in its different configurations, a curved front optics, or an optics of hemispherical, aspherical, parabolic, concede, convex, biconcave, biconvex or stepped optics. The real focal length of the radar is shorter than that of the lens utilised in the antenna. The standard dimensions of the electronic transception and processing circuit part are very limited and contained.

18 Claims, 4 Drawing Sheets

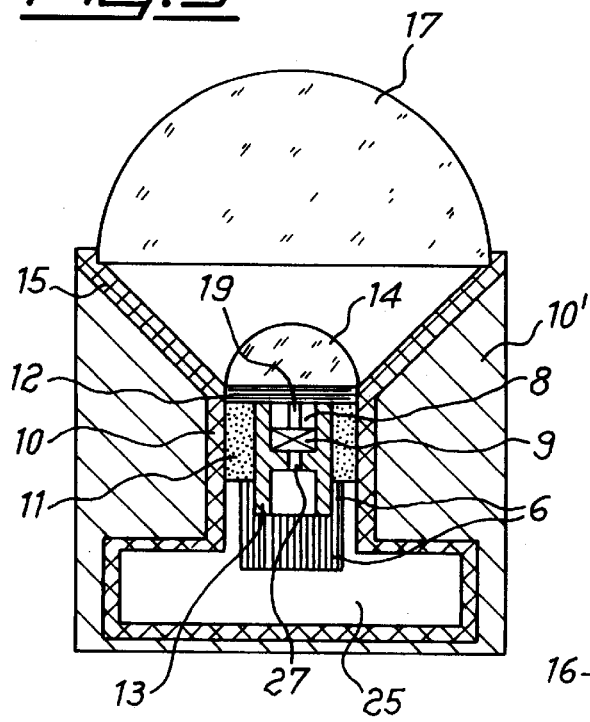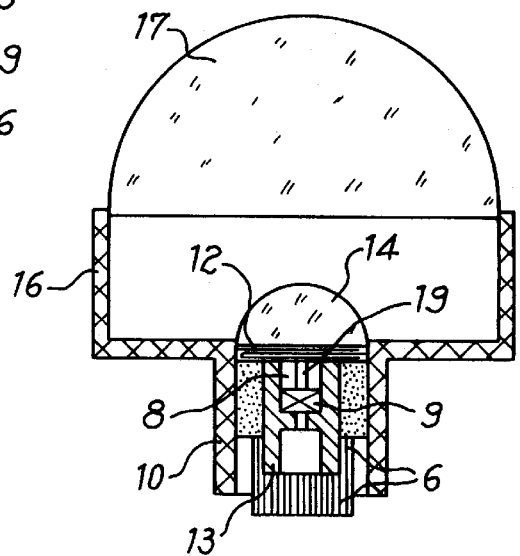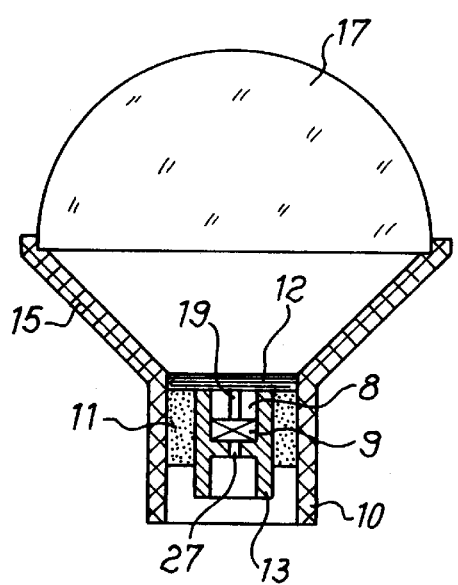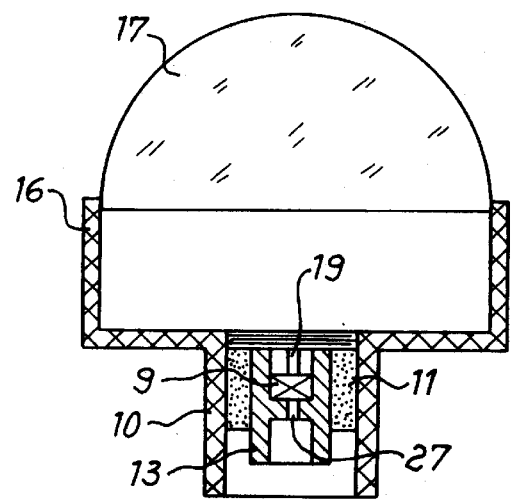

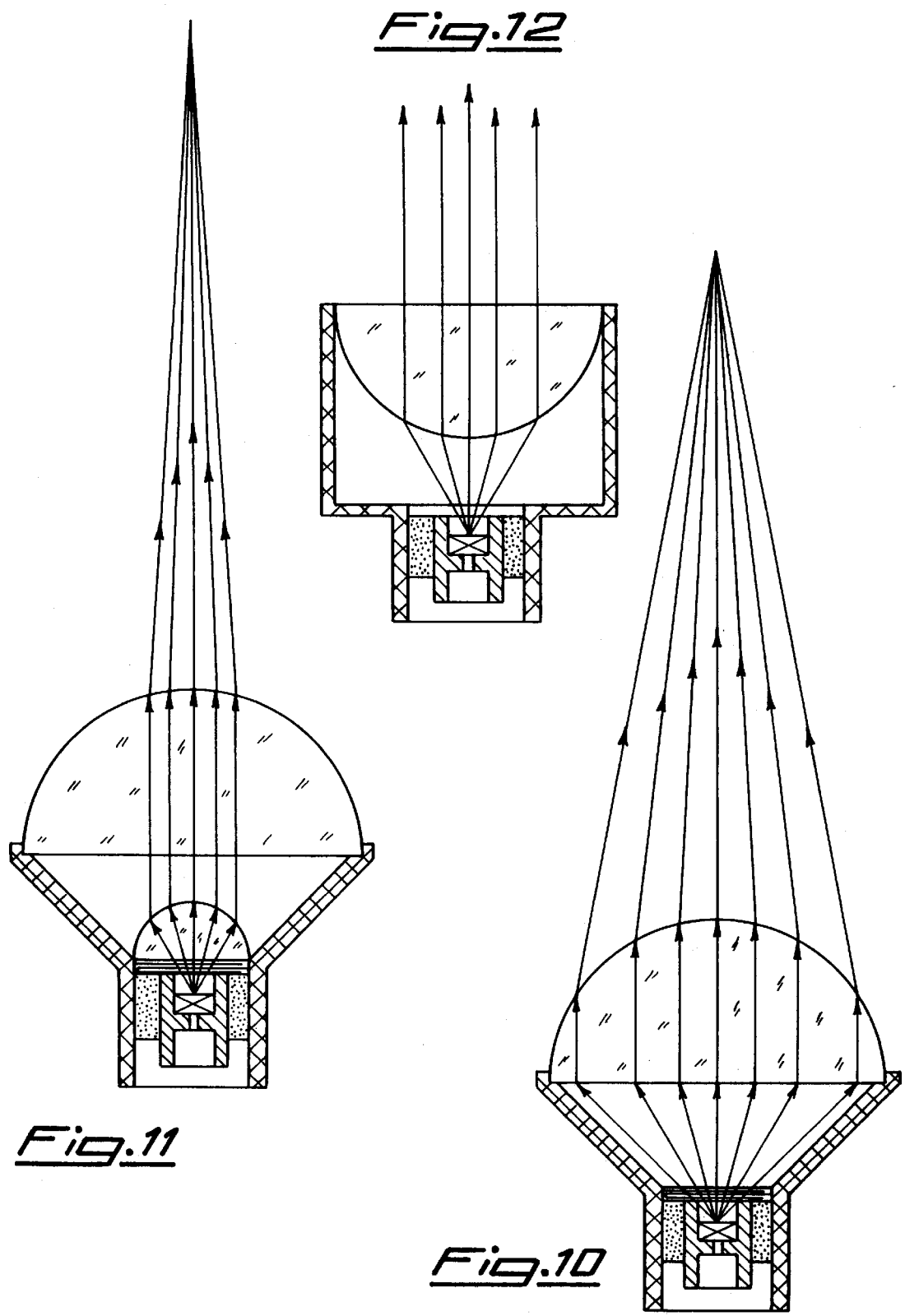

OBSTACLE SENSOR OPERATING BY COLLIMATION AND FOCUSING OF THE EMITTED WAVE

The present invention relates to an obstacle sensor operating by collimation and focusing of the emitted wave, which is substantially constituted by: a unit suitable for the generation and reception of electromagnetic radiations, a data analyser/discriminator and by an antenna suitable for the collimation and focusing of the transceived waves. Said antenna performs on the reflected waves, before sending them to the receiving/transmitting part, the same operations carried out on the transmitted waves. The invention concerns the micro-wave and millimetric wave devices, and in particular the compact solid-state micro-wave and millimetric wave devices. By the term "millimetric waves" there is intended to indicate the whole millimetric and sub-millimetric system.

The transceiving unit comprises a transmission part and a receiving part directly connected to the sign analysis part. The transmission part generates the radiation while the reception part receives the radiation reflected by the obstacle, generating output signal wherefrom it is possible to determine useful information for the applications of interest, such as, for instance, the speed and the position of the identified objects, the position of a plane, a level, and so on. The latter task is performed by the data analysis and processing electronic circuit. The microwaves emitted omnidirectionally are transmitted, focused and concentrated in one only coherent a phased beam, while the reflected or echo unidirectional wave, due to the presence of a still or moving obstacle is sensed by the system, and analysed and quantified with respect to the typical behaviour of the diode utilised as a microwave generator, or, and for instance, depending on the difference in frequency shifting typical of GUNN diodes, as energy and temperature change.

As is known, some of the radar apparatuses of the known art have general characteristics that, while being of great interest and very effective for some specific applications, are very limiting and cannot be adapted to use in the motor-car field. In fact, in the case in point, the radars to be used on road vehicles must have well defined requirements suitable to satisfy some basic needs, namely: a radar for motor-vehicles must be small, in order to allow an easy and economical disassembly onboard; it must be able of sensing exactly objects located before the vehicle within a range comprised between 0 and at least 150 m of distance; the total power absorbed for its working must be contained, of the order of some watts; the diameter of the radiation beam emitted must be, at a certain distance, sufficiently small to identify with the utmost precision the position of the object sensed, independently of its being still or moving; the number of false alarms produced must be as small as possible. Besides, the system must be mass-produceable at a low cost.

The limitations of the present radar systems ensue in particular, from the dimensions their radiation beams take up at a certain distance from the same transmission point. This problem is generally ascribed to the diameter of the antenna; in fact, at present the only way to produce increasingly small radiation beams is by use of increasingly large antennae. As a consequence, radars having a sufficiently high resolution power require large antennae, and therefore their overall dimensions are unacceptable for use in cars. In the present car applications, the most frequently used radar type is the multidirectional beam type, indispensable for space explorations. In such systems, the size increase of the antennae necessary to obtain high resolutions involves also a longitudinal size increase in the same radars, with ensuing problems of positioning of said systems on vehicles.

The object of the present invention is to eliminate the above drawbacks. The present invention, such as is characterised by the claims, solves the problem by means of an obstacle sensor operating by collimation and focusing of the emitted wave, through which the following results are achieved: the system is a millimetric small size system of adequate range, with a low power consumption, a very low, substantially insignificant percent of false alarms, which can operate as a signal transceiving antenna with an optimum image definition even at extremely reduced distances (in the order of 1 mm); it may be mass-produced at low costs, with the adoption of one or more lenses, wherein the longitudinal dimension of the antenna is shorter than the focal length of the same optic apparatus, and with the realisation of transceving and analysis electronic circuits of the so-called feed-assembly type, provided with a heat dissipation system for the circuitry.

The intrinsic advantages of the invention comprise substantially the reduced size of the general structure of the obstacle sensor, its extreme compactness and effectiveness both in normal atmospheric conditions and in particularly severe climate conditions. More specifically, the system can be adopted in the motor-car field for a greater safety of the vehicles and their passengers in road traffic, aid to lighten and facilitate the activity of drivers in particular road conditions, such as: poor visibility during the night, presence of fog, rain, snow, and so on. The invention acts, by means of signals or automatic intervention measures, in the presence of obstacles or in case of closeness with respect to other vehicles. The same invention may be advantageously used also for watch and traffic control systems. The system operates always and in any case within the frame and in the respect of the safety norms in force at present for electronic systems.

Figure 2:
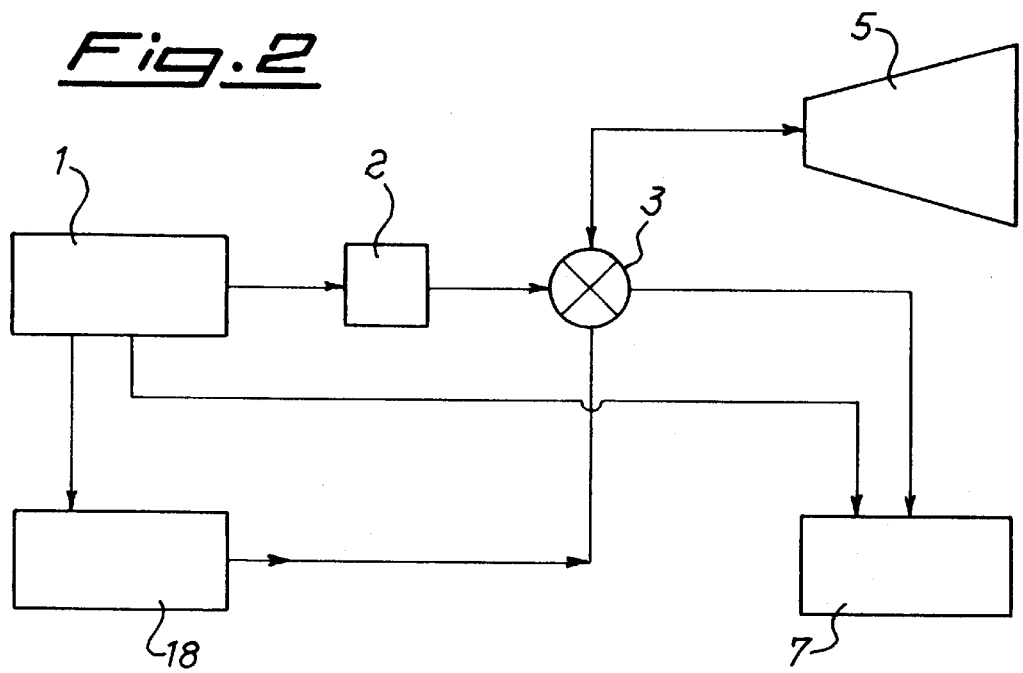
Figure 7:
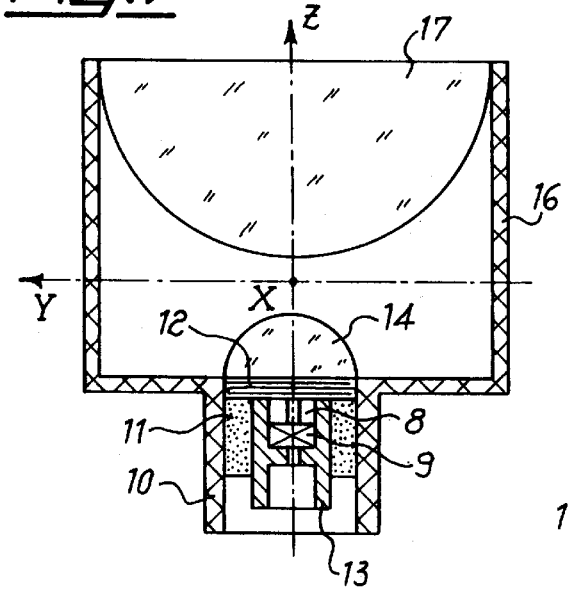
Figure 8:
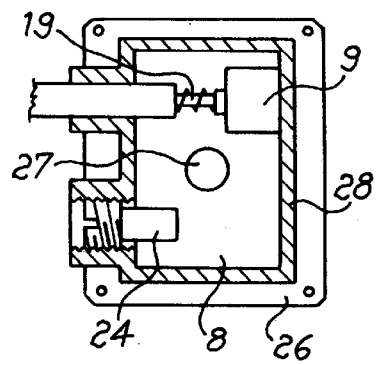
Figure 9A:
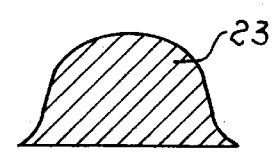
Figure 9B:
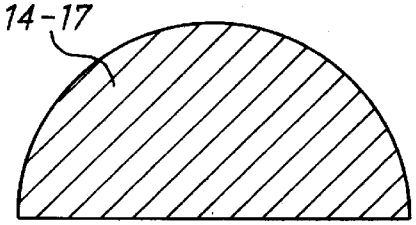
Figure 9E:
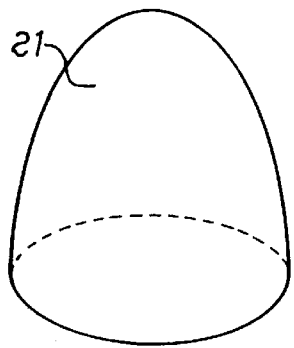
Figure 9C:
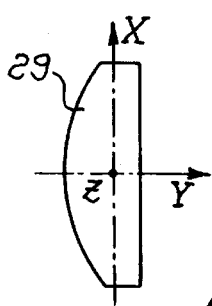
Figure 9D:
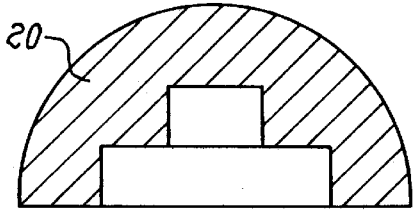
Figure 9F:
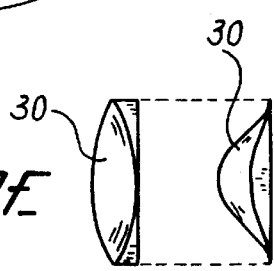
Figure 9G:
Figure 9H:
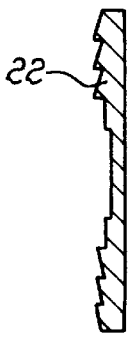

Further advantages obtainable with the obstacle sensor realised with a microwave and millimetric wave radar lie in that it is easily realisable and mass-reproducible in a very economical way, allowing its wide application, not only in the field of motor-cars to sense the presence of obstacles during operation, but also for other uses such as: antitheft and protection against break-ins both for moving means and houses, sheds, and the like, self-levelling systems for industrial machines and vehicles, level sensors, fixed post detectors for speed-ways, ports, railways, tunnels and so on. The invention is described with more detail in the following, according to some embodiments given by way of non limiting examples, with reference to the attached drawings, wherein:

FIG. 1 is a block diagram of the electronic circuit of data transmission and processing of the obstacle sensor, FIG. 2 is the whole block diagram of the electronic antenna/circuit system of transmission, analysis and processing, FIG. 3 is a schematic cross-section of a first embodiment of the sensor with two hemispherical lenses alignedly oriented, with a truncated-cone second cavity, FIG. 4 shows the same sensor of FIG. 3, with a cylindrical second cavity, FIGS. 5 and 6 show the same sensor of FIGS. 3 and 4, provided with one only lens, FIG. 7 shows the same sensor of FIG. 4, with the hemisphercal lens oriented in opposite direction, FIG. 8 shows the cross-section of an embodiment of the generating cavity containing the microwave generator and the frequency generator, FIGS. 9a–9h show various shapes of lenses adoptable for the formation of the invention, and FIGS. 10, 11 and 12 show the emission diagrams of embodiments having different optic configurations.

The figures refer to an obstacle sensor operating by collimation and focusing of the emitted wave, substantially constituted by a microwave generator represented by an IMPATT or GUNN in GaAs or InP technology diode, kept at a constant temperature and protected by means of adequate insulation.

According to significant embodiments, solely given by way of non limiting examples, reference will be explicitly made to configurations adopting a GUNN diode; after a first co-ordination stage, the waves generated by said diode pass through one or several lenses from dielectric material, or artificial dielectric, of high dielectric constant, permeable to electromagnetic radiation and resistant against weathering. In the various embodiments, such loses may have a hemispheric, aspherical, elliptic, concave, convex, biconvex, stepped shape. The optical apparatus is realisable from plastic material, plexiglass, ceramic, quartz, glass, polyethylene, polyester, teflon and the like, and in any case from dielectric material or artificial dielectric with a high dielectric constant, permeable to electromagnetic radiation and resistant against weathering, very homogeneous and compact, free from impurities and/or inclusions.

The function of the optical apparatus is to concentrate and focus the beam generated and emitted by the system, so as to lend it the utmost intensity and power. The reflected wave, or echo, obtained by the bounce produced by the presence of an obstacle, can be sensed by the same device by exploiting the intrinsic property of the diode, in order to discriminate the different nature of the object encountered and its relative velocity. The microwaves omnidirectionally emitted by the antenna are focused and concentrated in one only coherent and phased beam. The unidirectional reflected wave is sensed by the system and analysed and quantified with respect to the typical behaviour of the diode utilised as microwave generator, or as function of the shifting difference which is typical of GUNN diodes as energy and temperature change.

A stabilised feeding unit (1), through a lowpass filter (2) and a square wave multiplier (3) or a wave multiplier of any suitable form (4), such as for instance: sinusoid, triangular, swath and so on, is connected, together with an analysis and processing circuit (7), to a lens antenna (5) laving a generating cavity (8) containing the GUNN (9) diode feeding anode (19). In a first exemplifying embodiment, the obstacle sensor is substantially constituted by an external envelope (10) in whose lower part there is provided a body (11) preferably from metal, provided with a regulation system that operates also as a polarisation circuit bearer (12). Body (11) has also a shield function against intereferences due to external magnetic fields. In the middle of said structure there is obtained the seat (13) containing the generating diode (9) and anode (19) feeding the former, and wherein the generation cavity is configurated (8). Such containing seat (13) is also a cathode for the generating diode. The microwave generating GUNMT diode is coupled to and fed by an anode connected to the feeding/receiving circuit. In the different embodiments, such anode may have solely the function of connecting GUNN diode (9) to feeding, or longitudinally develop above said diode for a length equal to ¼ wave, and may be therefore protected and supported by an insulating core provided with the suitable electric connections necessary to the anode (19). Said core circumscribes in the upper part and coaxially the generating cavity (8); besides, it may comprise the necessary electric connections and possibly a partial metal covering for the connection with the underlying cylinder. In the various embodiments, the micrcwave generating GUNN diode (9), anode (19) and the frequency regulator (24) may be located in the cavity (8) generating the same waves emitted by said GUNN diode. The cavity may also be realised in a metal body or a seat (28) closed by a flange (26) having a suitable shape, in communication with the outside through an iris (27).

In correspondence of the anti-interference body or envelope (11) and seat (13) there is obtained an anti-dispersion empty space (25), wherein a device (6) is located for the automatic regulation of the temperature of antenna (5), as well as the necessary connection electronic components or electric elements. The temperature regulation system (6) may be of the retroactivated type or of the thermal drift electronic compensation type. In the upper position, coaxially to said generating cavity, there is provided, according to a non limiting embodiment, a first lens (14) from dielectric or artificial dielectric material, permeable to electromagnetic radiations and weather-resistant, which lens is located at the base of a passive intermediate reflector, having a truncated-cone (15) or a cylindrical (16) shape. In the upper part, the passive reflector is enclosed by a second external lens (17) from dielectric or artificial dielectric material, permeable to electromagnetic radiations and weather-resistant, whose size is greater than the internal one (14). In other possible embodiments, the obstacle sensor may be provided with several axially arranged lenses, or one only external lens (17).

In practice, the antenna comprises at least one lens (17) from dielectric or artificial dielectric material, permeable to electromagnetic radiations and weather-resistant, a polarisation apparatus (12), a microwave selection cavity (8), a system (6) for regulating and keeping constant the temperature or for compensation of the thermal drift and an external envelope (10), protected by a shock-proof layer (10') from rubber, shockproof plastic material, or the like. The lens serves for the concentration of the electromagnetic waves emitted according to the main axis of the antenna (5). A reduction in the axial overall dimensions of the antenna may lie obtained by adopting a lens having a short focal length, which may be realised as a stepped lens (20) which allows to reduce both the losses and the geometric proportions, with a reduction in its thickness. Through a suitable selection of the profiles which the adopted lens can take up, it is possible to optimise the radiation behaviour. The profile of the lens, or lenses, affects the direction characteristics of the antenna (5), the width of the lobes of the radiation diagram being either equal or almost equal in all of the section planes, or very different in two orthogonal section planes. In case of cylindrical lenses, the lens only provide to the focusing of the beam in a plane, while, if necessary, a wave generation device provides to the beam generation in the second plane orthogonal to the first one. A lens having a hemispherical profile (14–17) irradiates in the xz plane in such a way that a spherical wave coming from its focus is converted into a wave having uniform phase fronts, while a lens having a differently shape profile, such as for instance a spherical sector lens with a cylindrical extension (29), causes the spherical wave, that has gone through the hemispherical lens, to have non uniform phase fronts. From the above, it is obvious that, in case of special applications for which there is needed a system having a different directivity with a lobe width very different in two different planes orthogonal to one another, lenses may be realised that have different profiles in two section planes; a non limiting example may be that of the lens indicated by (30). In other solutions, and according to the specific needs, the adopted lenses may be individual lenses having different configurations or coupled lenses having configurations either equal or different from one another. In the figures there are shown lenses having a hemispherical shape, but this is not limiting, as it is possible to utilise aspherical (23), elliptic (21), concave, convex, biconvex and even Fresnel (22) lenses. Significantly, stepped or Fresnel lenses known to be little suitable for the practical use, as they have a very narrow band, may be exploited, in this specific case, in an optimum way as the transmission band iv very narrow in itself. As concerns Frensel lenses, types having openings of different shape, for instance rectangular or elliptic, may be used in the different embodiments, depending on the different focusing desired in the horizontal and the vertical planes.

In the various configurations, the lenses are used with different orientations: the hemispherical ones, with the meniscus oriented towards the outside or the inside of the antenna; the Fresnel ones, with the steps oriented towards the inside or the outside. Advantageously, in the last case no shadow zones appear which cause an increase in the secondary lobes of the radiation diagrams. On the contrary, for the specific utilisation in the present antennae, there may be the drawback of dust and/or dirt accumulation in correspondence of the steps: this involves the need of utilising a further transparent protection permeable to electromagnetic radiation arid resistant against weathering, located outside the system. An analogous external protection is necessary also when the lens or lenses adopted are made from dielectric or artificial dielectric material, permeable to electromagnetic radiation that, however, does not ensure the necessary protection against weathering. In the embodiments where the optical apparatus is constituted at least by a lens, it is also possible to shift the lens or lenses along the main direction of the main emission beam, in order to optimise the regulation of the optical apparatus as a whole.

The polarisation apparatus (12) allows only the passage of radiations having a specific polarisation, while it blocks those having an orthogonal polarisation as, in the very case of radars used for the remote sensing of vehicles, there might also be sensed, on the side of the main lobe or the secondary lobes of the radiation diagram, perturbing radiations ascribable to vehicles running laterally and frontally and in the contrary direction, and that use the same sensing system. The elimination of the perturbing radiations is solved in an optimum way by rotating the linear polarisation by 45°. In this way, the radiations of vehicles that run in the opposite direction is invisible, as in the contrary running direction a linear polarisation of +45° becomes a linear polarisation of −45° and vice-versa; in this way, the orthogonally polarised waves of the antenna cannot be received by the latter. In an alternative embodiment, as much valid and comprised in the present invention, instead of the linear polarisation rotated by 45°, a circular polarisation can be adopted which does not cause the already described effect as a circular polarisation remain such even if the vehicle runs in the opposite direction. The electromagnetic wave concentration and focusing lens or lenses are arranged in the special housing with the addition of a gasket suitable to ensure a protection and seal against weathering. In the millimetric wave generation cavity (8) there is performed their selection according to the desired frequency. In the configurations of the examples, the generation cavity may be for instance advantageously and economically obtained from aluminium, precision injection moulded parts or the like; it is substantially constituted by a metal body or seat (13) supported by the regulation and support body (11) or, in another solution, by a metal plate (26) and housing (28), in communication with the outside through iris (27). Housing (28) contains the frequency selection apparatus (24), the GUNN diode feeding anode (19) and the same diode (9). The metal body or seat (13) as well as flange (26) and housing (28) may be obtained from steel or any other material suitable for the desired aim. The retroaction system (6) of regulation of the temperature or of compensation of the thermal drift has the function of keeping antenna (5) always at a constant temperature, or at least at a temperature comprised between specific prefixed boundaries. The external envelope (10) protects and insulates the system from the external environment; it is constituted by a housing, preferably from metal, produced by an injection moulding process or other adequate processes, and by a shock-proof envelope (10') preferably from rubber, shock-proof plastic material or the like.

The electronic part is constituted by a stabilised feeding unit (1), a generator of square wave pulses or pulses of any other suitable form, such as for instance: sinusoid, triangular, saw-tooth, and so on, which generator acts as a modulator, and by a reception, processing and analysis circuit (7). The whole focal plane is rendered impermeable to electromagnetic waves by means of a metal surface, so that the frequencies higher or lower than the network frequency cannot reach the electronic circuit.

The feeding, modulation, filtering, amplification and transception circuit, as well as the analysis circuit may also be of an integrated and miniaturised type.

Even though the present invention has been described and illustrated according to some specific non limiting embodiments, it will be obvious to those skilled in the art that several changes in the components, the structures, the electronic circuits, the combinations of the various lens shapes-and the compositions of the optical apparatus, the circuit organisation and the components, can be made, without falling outside the field and scope of the invention.

I claim:

1. An obstacle sensor operating by collimation and focusing of emitted microwaves, said obstacle sensor including:
   a) a stabilized feeding unit (1);
   b) a lens antenna (5) operatively connected to said stabilized feeding unit;
   c) an analysis and processing circuit (7) operatively connected to said stabilized feeding unit; and
   d) a wave pulse generator (18) operatively connected to said feeding unit and said lens antenna; said lens antenna including an external envelope (10), a body (11) provided in said external envelope, a generating cavity (8) containing a microwave generating diode (9) and a diode feeding anode (19) arranged in a seat (13) acting as a cathode for said generating diode, a polarization circuit (12), a passive intermediate reflector (15, 16), and at least one optical apparatus including at least one focusing and concentrating lens (14, 17) of microwaves emitted along an axis of the antenna;

whereby the microwaves emitted by said antenna are focused and concentrated by said at least one optical apparatus in only one coherent and phased beam, and unidirectional reflected microwaves or echo, derived from sensing an obstacle, are sensed by said lens antenna and analyzed and quantified by said microwave generating diode.

2. The obstacle sensor as defined in claim 1, wherein said microwave generating diode is an IMPATT microwave generating diode.

3. The obstacle sensor as defined in claim 1, wherein said microwave generating diode is a GUNN diode and the unidirectional reflected microwaves or echo are analyzed and quantified thereby depending on the difference in frequency shift of the GUNN diode, as energy and temperature change.

4. The obstacle sensor as defined in claim 1, wherein the body (11) and the seat (13) are constituted by a housing (28) closed by a flange (26) and containing a frequency selection apparatus (24), the microwave generating diode (9) and the anode (19) feeding said microwave generating diode (9); said housing (28) forming the cavity (8) and being open toward the outside through an iris (27).

5. The obstacle sensor as defined in claim 4, wherein the seat (13), the housing (28) and the flange (26) are made of steel.

6. The obstacle sensor as defined in claim 1, wherein an anti-dispersion empty space (25) is provided between the body (11) and seat (13), a device (6) for an automatic temperature regulation of the antenna and optional electric and electronic connection elements being located in said empty space (25).

7. The obstacle sensor as defined in claim 6, wherein said device (6) for automatic temperature regulation is of retro-activated type.

8. The obstacle sensor as defined in claim 6, wherein said device (6) for automatic temperature regulation is of thermal drift electronic compensation type.

9. The obstacle sensor as defined in claim 1, wherein said anode (19) feeding the microwave generating diode (9), developes longitudinally above said diode (9) for a length equal to ¼ wave and it is protected and supported by an insulating core provided with electric connection for said anode (19), said core circumscribing in the upper part and coaxially the generating cavity (8) and comprising the electric connections.

10. The obstacle sensor as defined in claim 1, wherein a first lens (14) made of dielectric material, permeable to electromagnetic radiation and weather-resistant, is located at the base of the passive intermediate reflector (15, 16), in the upper portion and coaxial to the generating cavity (8).

11. The obstacle sensor as defined in claim 10, wherein a second lens (17) having a size greater than the first lens (14) and made of dielectric material, permeable to the electromagnetic radiation and weather-resistant, is located at the upper part of the passive intermediate reflector (15, 16).

12. The obstacle sensor as defined in claim 1, wherein the passive intermediate reflector has a cylindrical shape (16).

13. The obstacle sensor as defined in claim 1, wherein the passive intermediate reflector has a truncated cone shape (15).

14. The obstacle sensor as defined in claim 1, wherein the external envelope (10) is covered by a shock-proof layer (10').

15. The obstacle sensor as defined in claim 1, wherein the lens has a short focal length and is of stepped type (20).

16. The obstacle sensor as defined in claim 1, wherein the shape of the lens is selected from the group consisting of hemispherical, spherical, elliptic, concave, convex, biconvex and Fresnel.

17. The obstacle sensor as defined in claim 1, which includes first and second lenses having different shape.

18. The obstacle sensor as defined in claim 1, wherein the external envelope (10) and the seat (13) are made of aluminum.

* * * * *